US010829416B2

(12) United States Patent
Kamitani et al.

(10) Patent No.: US 10,829,416 B2
(45) Date of Patent: Nov. 10, 2020

(54) RAPID-HARDENING ADMIXTURE AND METHOD FOR PRODUCING SAME

(71) Applicant: MITSUBISHI MATERIALS CORPORATION, Chiyoda-ku (JP)

(72) Inventors: Kiyoshi Kamitani, Chichibu-gun (JP); Kenji Tokunaga, Tokyo (JP); Hideo Tawara, Tokyo (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 94 days.

(21) Appl. No.: 16/088,354

(22) PCT Filed: Mar. 31, 2017

(86) PCT No.: PCT/JP2017/013604
§ 371 (c)(1),
(2) Date: Sep. 25, 2018

(87) PCT Pub. No.: WO2017/171006
PCT Pub. Date: Oct. 5, 2017

(65) Prior Publication Data
US 2019/0161409 A1 May 30, 2019

(30) Foreign Application Priority Data

Mar. 31, 2016 (JP) ................................. 2016-073415
Mar. 27, 2017 (JP) ................................. 2017-060980

(51) Int. Cl.
| C04B 28/06 | (2006.01) |
| C04B 24/06 | (2006.01) |
| C04B 22/10 | (2006.01) |
| C04B 22/14 | (2006.01) |
| C04B 40/00 | (2006.01) |
| C04B 22/00 | (2006.01) |
| C04B 103/12 | (2006.01) |
| C04B 103/14 | (2006.01) |

(52) U.S. Cl.
CPC ........ *C04B 28/065* (2013.01); *C04B 22/0093* (2013.01); *C04B 22/10* (2013.01); *C04B 22/147* (2013.01); *C04B 24/06* (2013.01); *C04B 28/06* (2013.01); *C04B 40/0028* (2013.01); *C04B 2103/12* (2013.01); *C04B 2103/14* (2013.01)

(58) Field of Classification Search
CPC ... C04B 22/10; C04B 22/0093; C04B 22/147; C04B 24/06; C04B 28/06; C04B 28/065; C04B 40/0028; C04B 2103/12; C04B 2103/14
See application file for complete search history.

(56) References Cited

U.S. PATENT DOCUMENTS 8,950,928 B2 * 2/2015 Nakashima ............. C04B 28/02
106/278

FOREIGN PATENT DOCUMENTS

| CN | 1771210 A | 5/2006 | |
| CN | 104-203886 A | 12/2014 | |
| JP | 3-41420 B2 | 6/1991 | |
| JP | 2006-335620 A | 12/2006 | |
| JP | 3912425 B1 | 5/2007 | |
| JP | 2007320835 A * | 12/2007 | ............. C04B 28/06 |
| JP | 2008-274580 A | 11/2008 | |
| JP | 2012121763 A * | 6/2012 | ............. C04B 22/08 |
| JP | 2014111516 A * | 6/2014 | ............. C04B 22/08 |
| JP | 2014-181165 A | 9/2014 | |
| JP | 2014181165 A * | 9/2014 | |
| JP | 2014-205592 A | 10/2014 | |
| JP | 2015-183114 A | 10/2015 | |
| WO | WO-2016208277 A1 * | 12/2016 | ............. C04B 22/08 |

OTHER PUBLICATIONS

International Search Report dated May 30, 2017, in PCT/JP2017/013604 filed Mar. 31, 2017.
Zhang Zeye, "Drilling Technology for Engineering Construction", Chengdu Science and technoiogy University Press, Mar. 31, 1993, p. 139.
Office Action dated Aug. 25, 2020, in corresponding Chinese Patent. Application No, 201780020091.7 (with English translation), citing documents AO, AP and AW therein.

* cited by examiner

*Primary Examiner* — Anthony J Green
(74) *Attorney, Agent, or Firm* — Oblon, McClelland, Maier & Neustadt, L.L.P.

(57) ABSTRACT

The present invention provides a rapid-hardening admixture for accelerating hardening of a cement composition and a method for producing the same. The rapid-hardening admixture includes calcium aluminate, inorganic sulfate, and a setting modifier, in which the calcium aluminate has an average particle diameter in a range of 8 μm to 100 μm, and the setting modifier has an average particle diameter of 5 μm or less.

6 Claims, 1 Drawing Sheet

RAPID-HARDENING ADMIXTURE AND METHOD FOR PRODUCING SAME

TECHNICAL FIELD

The present invention relates to a rapid-hardening admixture for accelerating hardening of a cement composition, and a method for producing the same.

Priority is claimed on Japanese Patent Application No. 2016-073415, filed on Mar. 31, 2016, and Japanese Patent Application No. 2017-060980, filed on Mar. 27, 2017, the contents of which are incorporated herein by reference.

BACKGROUND ART

As a rapid-hardening admixture of a cement composition, an admixture in which calcium aluminate and inorganic sulfate are combined is known. However, there have been problems that this rapid-hardening admixture in which calcium aluminate and inorganic sulfate are combined has a strong action of accelerating hardening of the cement composition, and, in the cement composition containing this rapid-hardening admixture, a time (setting initial time) from addition of water until the cement starts to set is short so that it is difficult to secure sufficient pot life. For this reason, in an admixture in which calcium aluminate and inorganic sulfate are combined, addition of a setting initial modifier is performed to regulate the setting initial time of the cement composition. As the setting initial modifier, inorganic carbonate, oxycarboxylic acid, or sodium aluminate is used.

Patent Document 1 discloses an ultra-rapid-hardening cement composition which contains, as a main component, a quick-hardening cement containing 15 to 35% by weight of a quick-hardening component having a weight ratio of calcium aluminate to inorganic sulfate of 1:0.5 to 3, and contains, in terms of internal proportion of weight, 0.2 to 3% of sodium aluminate, 0.2 to 5% of inorganic carbonate, and 0.1 to 2% of oxycarboxylic acids.

Patent Document 2 discloses a calcium aluminate-based rapid-hardening admixture that contains calcium aluminate, inorganic sulfate, and a setting modifier, in which sodium aluminate, inorganic carbonate, and carboxylic acids are used as the setting modifier, and at least one of these setting modifiers has a particle size constitution including 10 to 45% by mass of first particles having an average particle diameter greater than 45 μm and equal to or less than 90 μm, 30 to 70% by mass of second particles having an average particle diameter greater than 90 μm and equal to or less than 150 μm, and 5 to 30% by mass of third particles having an average particle diameter greater than 150 μm and equal to or less than 500 μm, in which the second particles are included in an amount larger than the first particles and also larger than the third particles.

CITATION LIST

Patent Document
[Patent Document 1] Japanese Examined Patent Application, Second Publication No. H3-41420
[Patent Document 2] Japanese Patent No. 3912425

DISCLOSURE OF INVENTION

Technical Problem

It is required that a cement composition containing a rapid-hardening admixture can stably and sufficiently secure a pot life, that is, a setting initial time is stable and long, and fluidity is high during a period from addition of water until hardening reaction proceeds. In addition, after completion of construction work, it is required that hardening occurs at an early stage and high strength (compression strength) is developed, that is, excellent initial strength developing properties are exhibited.

However, in the ultra-rapid-hardening cement composition disclosed in Patent Document 1, there were problems that it is difficult to secure a long pot life of as long as 60 minutes without reducing a compression strength at a young age (about 3 hours of age), and spots are observed on a hardened body of the cement composition and these parts become defects, thereby causing decrease in long-term strength. In addition, there was a problem that setting time greatly varies depending on an environmental temperature, thereby resulting in poor workability at a construction site.

Further, in the calcium aluminate-based rapid-hardening admixture disclosed in Patent Document 2, by specifying a particle size constitution of sodium aluminate, inorganic carbonate, and carboxylic acids to be added, initial strength developing properties and environmental temperature dependent properties of setting initial time are improved with respect to an ultra-rapid-hardening cement composition using cement mixed with the admixture. However, in a case where the ultra-rapid-hardening cement composition mixed with the rapid-hardening admixture described in Patent Document 2 is stored for about 3 months, setting time may be greatly changed as compared with immediately after production and initial strength developing properties may be decreased.

The present invention has been made in view of the above circumstances, and an object of the present invention is to provide a rapid-hardening admixture and a method for producing the same, in which in a case of being added to a cement composition, the rapid-hardening admixture is capable of further reducing variations in setting initial time of the rapid-hardening cement composition due to environmental temperature, increasing fluidity thereof during a period from addition of water until hardening reaction proceeds, improving initial strength developing properties thereof, and causing the rapid-hardening cement composition to stably maintain these effects even in a case of being stored for a long period of time.

Solution to Problem

In order to solve the above problems, the present inventors have conducted intensive studies, and, as a result, have found that by mixing and crushing a clinker containing calcium aluminate, and a setting modifier (one or more of inorganic carbonate, oxycarboxylic acid, sodium aluminate, and sodium sulfate) to obtain a mixed and crushed product, in which the calcium aluminate has an average particle diameter in a range of 8 μm to 100 μm and the setting modifier has an average particle diameter of 5 μm or less, and by adding inorganic sulfate to the mixed and crushed product thus obtained, it is possible to obtain a rapid-hardening admixture which is capable of further reducing variations in setting initial time of the rapid-hardening cement composition due to environmental temperature, increasing fluidity thereof during a period from addition of water until hardening reaction proceeds, improving initial strength developing properties thereof, and causing the rapid-hardening cement composition to stably maintain effects even in a case of being stored for a long period of time.

The present invention has been made on the basis of the above findings, and a rapid-hardening admixture of the present invention includes calcium aluminate, inorganic sulfate, and a setting modifier, in which the calcium aluminate has an average particle diameter in a range of 8 μm to 100 μm, and the setting modifier has an average particle diameter of 5 μm or less.

According to the rapid-hardening admixture of the present invention, the setting modifier has an average particle diameter of 5 μm or less, which is fine as compared with calcium aluminate (average particle diameter in a range of 8 μm to 100 μm), and thus is easily dissolved in water. Therefore, in a case where water is added to a rapid-hardening cement composition to which the rapid-hardening admixture of the present invention is added, the setting modifier is rapidly dissolved in water in a stable manner over a wide temperature range, and a setting modifier action by the setting modifier is exerted at an early stage. Thus, variations in setting initial time due to environmental temperature become small. In addition, since the setting modifier action by the setting modifier is exerted at an early stage, the setting initial time of the rapid-acting cement composition becomes stable and long, and fluidity after addition of water becomes high. On the other hand, after completion of the setting modifier action by the setting modifier, since hardening acceleration action of cement is exerted by the calcium aluminate and the inorganic sulfate, it is possible to improve initial strength developing properties of the rapid-hardening cement composition. Furthermore, the setting modifier is dispersed as fine particles in the rapid-hardening admixture. Thus, even in a case where the rapid-hardening cement composition to which the rapid-hardening admixture of the present invention is added is stored for a long period of time of time, it is unlikely that the setting modifier is segregated and a content of the setting modifier becomes non-uniform. Therefore, even in a case of being stored for a long period of time of time, it is possible to stably maintain the effects of the rapid-hardening admixture.

Here, in the rapid-hardening admixture of the present invention, it is preferable that the calcium aluminate has one or more compositions selected from the group consisting of $12CaO \cdot 7Al_2O_3$, $11CaO \cdot 7Al_2O_3 \cdot CaF_2$, and $CaO \cdot Al_2O_3$, and has a vitrification rate of 80% or more.

In this case, since the calcium aluminate has the above-mentioned composition and the vitrification rate is in the above-mentioned range, it is possible to reliably improve initial strength developing properties of a rapid-hardening cement composition without decreasing compression strength of a hardened body of the rapid-hardening cement composition. In addition, it is possible to prevent spots from being generated on the hardened body of the rapid-hardening cement composition.

Further, in the rapid-hardening admixture of the present invention, it is preferable that the inorganic sulfate is anhydrous gypsum having a Blaine specific surface area of 8,000 $cm^2/g$ or more.

In this case, since the inorganic sulfate is an inorganic gypsum having a Blaine specific surface area within the above-mentioned range, it is possible to reliably improve initial strength developing properties of a rapid-hardening cement composition without decreasing compression strength of a hardened body of the rapid-hardening cement composition. In addition, it is possible to prevent spots from being generated on the hardened body of the rapid-hardening cement composition.

Further, in the rapid-hardening admixture of the present invention, it is preferable that the setting modifier contains one or more of inorganic carbonate, oxycarboxylic acid, sodium aluminate, and sodium sulfate.

In this case, since the setting modifier contains one or more of the above-mentioned substances, it is possible to reliably reduce variations in setting initial time of the rapid-hardening cement composition due to environmental temperature.

Still further, in the rapid-hardening admixture of the present invention, it is preferable that, with respect to 100 parts by mass of the calcium aluminate, the inorganic sulfate is contained in a range of 50 parts by mass to 200 parts by mass, and the setting modifier is contained in a range of 0.1 parts by mass to 10 parts by mass.

In this case, since a content of the inorganic sulfate is set in a range of 50 parts by mass to 200 parts by mass with respect to 100 parts by mass of the calcium aluminate, an effect of improving rapid-hardening properties of cement is increased, so that it is possible to more reliably improve initial strength developing properties of the rapid-hardening cement composition. In addition, since a content of the setting modifier is set in a range of 0.1 parts by mass to 10 parts by mass or less with respect to 100 parts by mass of calcium aluminate, it is possible to more reliably reduce variations in setting initial time due to environmental temperature.

A method for producing a rapid-hardening admixture according to the present invention includes a step of mixing and crushing a clinker containing calcium aluminate and a setting modifier to prepare a mixed and crushed product, and a step of mixing the resulting mixed and crushed product with inorganic sulfate.

According to the method for producing a rapid-hardening admixture of the present invention, due to high hardness of the calcium aluminate clinker has, by mixing and crushing the calcium aluminate clinker and the setting modifier, it is possible to obtain a mixed and crushed product in which the setting modifier is selectively crushed into fine particles and the fine particles are dispersed in a state of being adhered to a surface of the calcium aluminate as primary particles or aggregated particles close thereto. As compared with the calcium aluminate, the setting modifier in this mixed and crushed product is fine, and thus easily dissolved in water. Therefore, in a case where water is added to a rapid-hardening cement composition to which the rapid-hardening admixture obtained by the production method of the present invention is added, the setting modifier is rapidly dissolved in water in a stable manner over a wide temperature range, and a setting modifier action by the setting modifier is exerted at an early stage. Thus, variations in setting initial time due to environmental temperature become small. In addition, since the setting modifier action is exerted at an early stage, the setting initial time becomes stable and long, and fluidity immediately after water pouring is improved. In addition, even in a case of being stored for a long period of time of time, it is unlikely that the setting modifier is segregated and the content of the setting modifier becomes non-uniform. Therefore, even in a case of being stored for a long period of time of time, it is possible to stably maintain these effects due to the rapid-hardening admixture.

Here, in the method for producing a rapid-hardening admixture of the present invention, it is preferable that the clinker containing calcium aluminate before the mixing and crushing has an average particle diameter in a range of 1 mm to 30 mm, the setting modifier before the mixing and crushing has a particle diameter in a range of 150 μm to 500 μm, and the mixing and crushing is carried out until a Blaine specific surface area of the mixed and crushed product falls within a range of 3,000 cm$^2$/g to 5,500 cm$^2$/g.

In this case, since the clinker containing calcium aluminate and the setting modifier are sufficiently mixed and crushed, it is possible to reliably obtain a mixed and crushed product in which the setting modifier is dispersed in a state of being adhered to a surface of the calcium aluminate as primary particles or fine particles close thereto.

Advantageous Effects of Invention

According to the present invention, it is possible to provide a rapid-hardening admixture and a method for producing the same, in which in a case of being added to a cement composition, the rapid-hardening admixture is capable of further reducing variations in setting initial time of the rapid-hardening cement composition due to environmental temperature, increasing fluidity thereof during a period from addition of water until hardening reaction proceeds, improving initial strength developing properties thereof, and causing the rapid-hardening cement composition to stably maintain effects even in a case of being stored for a long period of time.

BRIEF DESCRIPTION OF DRAWINGS

FIG. 1(A) is an image with a magnification of 1,000 times, and FIG. 1(B) is an image with a magnification of 3,000 times.

BEST MODE FOR CARRYING OUT THE INVENTION

Figure 1:
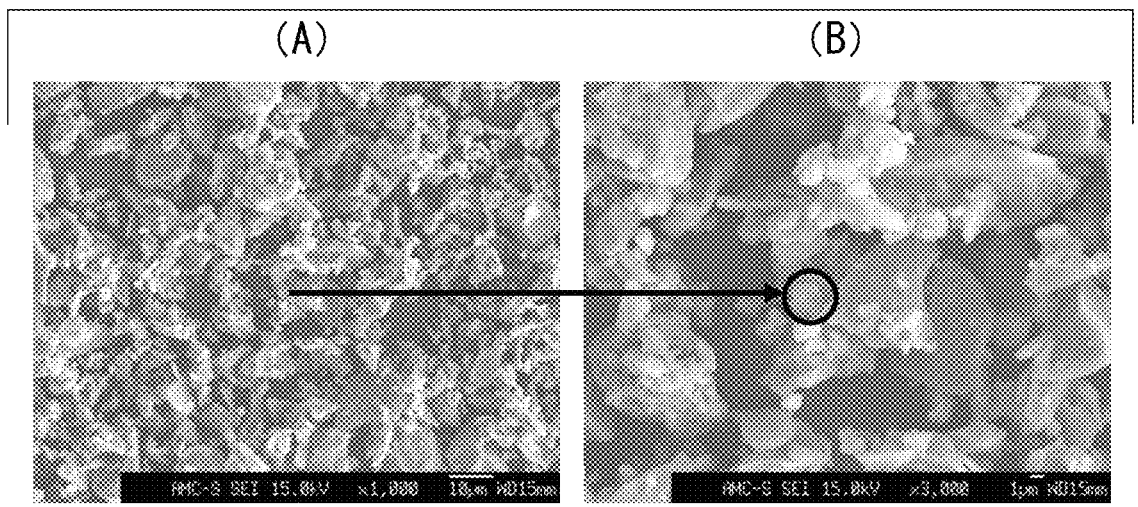
FIGS. 1 (A) and (B) shows scanning electron microscopic images of a mixed and crushed product of a calcium aluminate clinker and a setting modifier which is produced in Example 1.

Embodiments of the present invention will be described below.

A rapid-hardening admixture which is the present embodiment contains calcium aluminate, inorganic sulfate, and a setting modifier. The calcium aluminate has an average particle diameter in a range of 8 μm to 100 μm. The setting modifier has an average particle diameter of 5 μm or less.

The calcium aluminate has one or more compositions selected from the group consisting of $12CaO \cdot 7Al_2O_3$, $11CaO \cdot 7Al_2O_3 \cdot CaF_2$, and $CaO \cdot Al_2O_3$, and has a vitrification rate of 80% or more. The inorganic sulfate is anhydrous gypsum having a Blaine specific surface area of 8,000 cm$^2$/g or more. The setting modifier contains one or more of inorganic carbonate, oxycarboxylic acid, sodium aluminate, sodium sulfate and aluminum sulfate.

The blending amounts of the calcium aluminate, the inorganic sulfate, and the setting modifier are set so that, with respect to 100 parts by mass of the calcium aluminate, the inorganic sulfate is in a range of 50 parts by mass to 200 parts by mass, and the setting modifier is in a range of 0.1 parts by mass to 10 parts by mass.

The reasons why materials of the rapid-hardening admixture and blending amounts thereof are specified as described above will be described below.

(Calcium Aluminate)

The calcium aluminate elutes calcium ions and aluminum ions in a case of being brought into contact with water at the time of using the rapid-hardening cement composition and these ions are reacted with sulfate ions eluted from the inorganic sulfate to produce a hydrate such as ettringite ($3CaO \cdot Al_2O_3 \cdot 3CaSO_4 \cdot 32H_2O$) of needle-like crystal or monosulfate ($3CaO \cdot Al_2O_3 \cdot CaSO_4 \cdot 12H_2O$). Thus, the calcium aluminate has an action of improving initial strength developing properties of the rapid-hardening cement composition. In a case where an elution rate of calcium ions and aluminum ions from the calcium aluminate becomes too low, reactivity with sulfate ions may be deteriorated, and initial strength developing properties of the rapid-hardening cement composition may be decreased. On the other hand, in a case where an elution rate of calcium ions and aluminum ions from the calcium aluminate becomes too high, reactivity with sulfate ions is increased and a setting initial time of the rapid-hardening cement composition becomes too fast. Thus, it may be difficult to regulate the setting initial time even in a case of using a setting modifier, and it may be difficult to secure a sufficient pot life.

Therefore, in the present embodiment, the average particle diameter (average primary particle diameter) of the calcium aluminate is set in a range of 8 μm to 100 μm. In a case where the calcium aluminate has an average particle diameter of less than 8 μm, the elution rate of calcium ions and aluminum ions becomes too high, which may make it difficult to regulate the setting initial time of the rapid-hardening cement composition. On the other hand, in a case where the average particle diameter of the calcium aluminate exceeds 100 μm, the elution rate of calcium ions and aluminum ions becomes too low, which may decrease initial strength development of the rapid-hardening cement composition.

The average particle diameter of the calcium aluminate contained in the rapid-hardening admixture can be measured using, for example, a scanning electron microscope (SEM) and an electron probe microanalyzer (EPMA). That is, it is possible to perform measurements by identifying particles of the calcium aluminate contained in the rapid-hardening admixture from results of elements detected by an SEM image and an elemental analysis with the EPMA of the rapid-hardening admixture, calculating particle diameters from the SEM image with respect to the particles identified as the calcium aluminate, and obtaining an average value thereof. Particles in which only calcium and aluminum are detected by the elemental analysis with the EPMA can be identified as the particles of the calcium aluminate.

Further, in the present embodiment, as the calcium aluminate, one having one or more compositions selected from the group consisting of $12CaO \cdot 7Al_2O_3$, $11CaO \cdot 7Al_2O_3 \cdot CaF_2$, and $CaO \cdot Al_2O_3$, and having a vitrification rate of 80% or more is used. The vitrification rate is preferably 80% to 98%, and particularly preferably 90% to 98%. The calcium aluminate having the above composition and vitrification rate has a high elution rate of calcium ions and aluminum ions and a high reactivity. Thus, it is possible to reliably improve initial strength developing properties of the rapid-hardening cement composition.

The vitrification rate is a proportion represented by a glass structure in the calcium aluminate, and can usually be obtained by a point counting method using a polarization microscope or a powder X-ray diffraction/Rietveld analysis.

In the present embodiment, a sample of the calcium aluminate was subjected to point counting of a crystallized portion and a vitrified portion using a polarization microscope, and a proportion of a number of points of the vitrified portion in the entire number of points was calculated. Specifically, the calcium aluminate clinker was crushed, particles of 62 to 105 μμm were sieved, bromonaphthalene was used as immersion liquid with respect to 400 to 500 particles, and glass particles and crystal particles were distinguished from each other by a polarization microscope to calculate the vitrification rate as a count ratio for the entire particles.

It is preferable that the calcium aluminate has a Blaine specific surface area of 3,000 cm$^2$/g to 5,500 cm$^2$/g. In a case where the Blaine specific surface area is 3,000 cm$^2$/g to the calcium aluminate is brought into contact with water, the elution rate of calcium ions and aluminum ions becomes high and the reactivity with sulfate ions eluted from the inorganic sulfate becomes high. Thus, it is possible to more reliably improve initial strength developing properties of the rapid-hardening cement composition. On the other hand, due to the Blaine specific surface area of 5,500 cm$^2$/g or less, in a case where the calcium aluminate is brought into contact with water, it is avoided that the elution rate of calcium ion and aluminum ion becomes excessively high, and it is suppressed that the reactivity with sulfate ions becomes too high. The Blaine specific surface area is measured by a specific surface area test using a Blaine air permeation apparatus described in JIS R 5201 "Physical Test Method for Cement".

(Inorganic Sulfate)

The inorganic sulfate contained in the rapid-hardening admixture elutes sulfate ions in a case of being brought into contact with water at the time of using the rapid-hardening cement composition and these ions are reacted with calcium ions and aluminum ions eluted from the calcium aluminate to produce a hydrate such as ettringite of needle-like crystal or monosulfate. Thus, the inorganic sulfate has an action of improving initial strength developing properties of the rapid-hardening cement composition.

In a case where an elution rate of sulfate ions from the inorganic sulfate becomes slow, reactivity with calcium ions and aluminum ions eluted from the calcium aluminate may be deteriorated, the time from start of setting to hardening may become longer, and initial strength developing properties of the rapid-hardening cement composition may be deteriorated. Therefore, in the present embodiment, anhydrous gypsum having a Blaine specific surface area of 8,000 cm$^2$/g or more is used as the inorganic sulfate. Since the anhydrous gypsum having the above Blaine specific surface area has a high elution rate of sulfate ions and a high reactivity with calcium ions and aluminum ions eluted from the calcium aluminate, it is possible to reliably improve initial strength developing properties of the rapid-hardening cement composition. It is preferable that the Blaine specific surface area of the anhydrous gypsum is 12,000 cm$^2$/g or less. In a case where the Blaine specific surface area becomes too large, the elution rate of sulfate ions becomes too high and the reactivity with calcium ions and aluminum ions becomes excessively high. Thus, the time from start of setting to hardening become shorter, which may make it difficult to secure a sufficient pot life even in a case of using a setting modifier.

It is preferable that the anhydrous gypsum used as the inorganic sulfate is, in particular, type II anhydrous gypsum. The anhydrous gypsum (in particular, type II anhydrous gypsum) has a high reactivity with the calcium aluminate. Thus, it is possible to more reliably improve initial strength developing properties of a hardened body of the rapid-hardening cement composition.

(Setting Modifier)

The setting modifier has an action of regulating the time from addition of water to the rapid-hardening cement composition until setting of cement starts at the time of using the rapid-hardening cement composition, that is, an action of delaying a hardening time of cement. Due to the delayed hardening time of the cement by the setting modifier, fluidity of the rapid-hardening cement composition is improved during a period from addition of water to the rapid-hardening cement composition until hardening reaction of the cement proceeds.

It is considered that the setting modifier is dissolved in water and chelated with calcium ions or aluminum ions eluted from the calcium aluminate to form a film on a surface of the calcium aluminate, so that elution of calcium ions and aluminum ions from the calcium aluminate is temporarily suppressed, thereby developing a delaying action of a hardening time of the cement caused by the setting modifier. However, since the film formed on the surface of the calcium aluminate is extremely thin, dissolution and disappearance thereof occur in a relatively short time. After disappearance of the film, re-elution of calcium ions and aluminum ions from the calcium aluminate begins and hardening reaction of mortar proceeds.

In the present embodiment, the setting modifier is fine particles having an average particle diameter (average primary particle diameter) of 5 μm or less. Therefore, it is possible to rapidly dissolve the setting modifier in water over a relatively wide temperature range. The average particle diameter of the setting modifier is preferably 1 μm or more. In a case where the average particle diameter is less than 1 μm, aggregated particles may be easily formed.

The setting modifier contains one or more of inorganic carbonate, oxycarboxylic acid, sodium aluminate, and sodium sulfate. Since these agents are easily dissolved in water, by containing these agents as setting modifiers, a setting modifier action by the setting modifiers is exerted at an early stage. Thus, it is possible to more reliably reduce variations in setting initial time of the rapid-hardening cement composition due to environmental temperature. In addition, since a setting modifier action by the setting modifiers is exerted at an early stage, a setting initial time of the rapid-hardening cement composition becomes more stable and longer, and fluidity after addition of water becomes higher.

The inorganic carbonate is preferably carbonate or hydrogen carbonate of an alkali metal. Examples of the inorganic carbonate include sodium carbonate, potassium carbonate, sodium hydrogen carbonate, potassium hydrogen carbonate, lithium carbonate, and ammonium carbonate. One of these inorganic carbonates may be used alone, or two or more thereof may be used in combination. Examples of the oxycarboxylic acid include tartaric acid, citric acid, malic acid, gluconic acid, and maleic acid. One of these oxycarboxylic acids may be used alone, or two or more thereof may be used in combination.

It is preferable that two or more of inorganic carbonate, oxycarboxylic acid, sodium aluminate, and sodium sulfate are used in combination as the setting modifier. As combinations of two or more thereof, a 3-member combination of inorganic carbonate, oxycarboxylic acid, and sodium aluminate is preferable, and a 4-member combination of inorganic carbonate, oxycarboxylic acid, sodium aluminate, and sodium sulfate is more preferable. In a case where two or more setting modifiers are used in combination, it is sufficient that at least one of the setting modifiers is fine particles having an average particle diameter of 5 μm or less.

Among the setting modifiers, sodium sulfate has a particularly high rate of dissolution in water. Therefore, sodium sulfate has a high effect of improving fluidity of the rapid-hardening cement composition after addition of water. In addition, since sodium sulfate is easily dissolved in water over a wide temperature range, it also has an effect of reducing temperature dependency, with respect to a setting initial time, of the rapid-hardening cement composition after addition of water.

It is preferable that the fine particles of the setting modifier are dispersed in the rapid-hardening admixture as primary particles or aggregated particles close thereto. In a case where the setting modifier is dispersed as primary particles or aggregated particles close thereto, a rate of dissolution thereof in water is improved, and a setting modifier action by the setting modifier is exerted at an early stage. Thus, it is possible to reliably reduce variations in setting initial time due to environmental temperature. In addition, it is preferable that the fine particles of the setting modifier are adhered to a surface of the calcium aluminate. In this case, since the setting modifier comes into contact with water prior to the calcium aluminate, and thus is easily dissolved, so that a setting modifier action by the setting modifier is exerted at an early stage. Thus, it is possible to more reliably reduce variations in setting initial time due to environmental temperature.

The average particle diameter of the setting modifier can be measured using, for example, an SEM and an EPMA. That is, it is possible to perform measurements by identifying particles of the setting modifier contained in the rapid-hardening admixture from results of elements detected by an SEM image and an elemental analysis with an EPMA of the rapid-hardening admixture, calculating particle diameters from the SEM image with respect to the particles identified as the setting modifier, and obtaining an average value thereof. For example, particles in which only sodium is detected by the elemental analysis with the EPMA can be identified as the particles of sodium carbonate (inorganic carbonate).

(Blending Amounts)

In performing blending of the rapid-hardening admixture, in a case where a blending amount of the inorganic sulfate is too small, a production amount of a reaction product (ettringite, monosulfate) of the inorganic sulfate and the calcium aluminate may be decreased, and initial strength developing properties of the rapid-hardening cement composition may be reduced. On the other hand, in a case where a blending amount of the inorganic sulfate is too large, a setting initial time of the cement becomes fast, which may make it difficult to secure a sufficient pot life. In addition, the amount of calcium ions and aluminum ions eluted from the calcium aluminate is relatively small with respect to sulfate ions, so that a production amount of ettringite is reduced. Thus, initial strength developing properties of the rapid-hardening cement composition may be decreased. Furthermore, due to influence of the remaining inorganic sulfate, the amount of expansion after hardening becomes excessive, which may cause expansion breakdown.

Further, in performing blending of the rapid-hardening admixture, in a case where a blending amount of the setting modifier is too small, an action of the setting modifier is completed in a short period of time. Thus, a setting initial time of cement becomes fast, which may make it difficult to secure a sufficient pot life. On the other hand, in a case where a blending amount of the setting modifier is too large, an action of the setting modifier may continue for a predetermined time or more, and initial strength developing properties of the rapid-hardening cement composition may be decreased.

Therefore, in the present embodiment, blending amounts of the calcium aluminate, the inorganic sulfate, and the setting modifier are set such that, with respect to 100 parts by mass of the calcium aluminate, the inorganic sulfate is in a range of 50 parts by mass to 200 parts by mass, and the setting modifier is in a range of 0.1 parts by mass to 10 parts by mass.

Next, a method for producing a rapid-hardening admixture will be described.

The method for producing a rapid-hardening admixture of the present embodiment includes a mixing and crushing step of mixing and crushing a clinker containing calcium aluminate and a setting modifier to prepare a mixed and crushed product, and a mixing step of mixing the resultant mixed and crushed product with inorganic sulfate.

In the method for producing a rapid-hardening admixture of the present embodiment, the clinker used as a raw material of the calcium aluminate has a high hardness as compared with the setting modifier. Therefore, by mixing and crushing the calcium aluminate clinker and the setting modifier, the setting modifier selectively becomes fine particles, and fine particles of the setting modifier are produced. The fine particles of the setting modifier easily adhere to a surface of relatively coarse calcium aluminate particles. Accordingly, in the mixing and crushing step, it is possible to obtain a mixed and crushed product in which the fine particles of the setting modifier are dispersed in a state of being adhered to a surface of the calcium aluminate as primary particles or aggregated particles close thereto. As a mixing and crushing apparatus, a crushing apparatus such as an E type mill, a vertical type mill, and a tube mill can be used, but not limited thereto. Various crushing apparatuses commonly used as crushing apparatuses for clinker can be used.

The clinker containing calcium aluminate is preferably a clinker mineral.

The calcium aluminate clinker before crushing preferably has an average particle diameter in a range of 1 mm to 30 mm. In addition, it is preferable that the setting modifier before crushing has a particle diameter in a range of 150 μm to 500 μm.

In the mixing and crushing step, the mixing and crushing is preferably carried out until a Blaine specific surface area of the mixed and crushed product is in a range of 3,000 $cm^2/g$ to 5,500 $cm^2/g$, and is particularly preferably carried out until the Blaine specific surface area is in a range of 3,000 $cm^2/g$ to 4,500 $cm^2/g$. By carrying out the mixing and crushing until the Blaine specific surface area falls within the above range, the clinker containing calcium aluminate and the setting modifier are sufficiently mixed and crushed, which make it possible to reliably obtain a mixed and crushed product in which the fine particles of the setting modifier are dispersed in a state of being adhered to a surface of the calcium aluminate as primary particles or aggregated particles close thereto. In addition, the average particle diameter of the calcium aluminate in the mixed and crushed product is usually in a range of 8 μm to 100 μm, and the average particle diameter of the setting modifier is usually 5 μm or less.

In the mixing step, it is preferable that the inorganic sulfate to be mixed with the mixed and crushed product obtained in the mixing and crushing step includes anhydrous gypsum and has a Blaine specific surface area of 8,000 $cm^2/g$ or more.

In the mixing step, mixing of the mixed and crushed product and the inorganic sulfate is carried out by a dry mixing. As a dry mixing apparatus, a mixer such as a V type mixer, a ribbon mixer, and a Proshear mixer can be used, but not limited thereto. Various mixing apparatuses commonly used as a mixing apparatus for cement materials can be used. A mixing time can be appropriately adjusted depending on a capacity of the mixing apparatus and blending amounts of the respective materials.

The rapid-hardening admixture of the present embodiment can be used in combination with various cements. Examples of the cement include ordinary Portland cement, high early strength Portland cement, moderate heat Portland cement, low heat Portland cement, blast furnace cement, silica cement, fly ash cement, and silica fume cement. The amount of the rapid-hardening admixture is preferably in a range of 5 parts by mass to 50 parts by mass as the amount of the rapid-hardening admixture in a case where a total amount of the cement and the rapid-hardening admixture is set as 100 parts by mass. In a case where the amount is less than 5 parts by mass, strength developing properties at an early age (young age) is decreased, whereas in a case where the amount exceeds 50 parts by mass, a production cost may be increased, and the amount of the cement may be decreased so that long-term strength developing properties are decreased.

According to the rapid-hardening admixture which is the present embodiment having the constitution as described above, the calcium aluminate has an average particle diameter in a range of 8 μm to 100 μm, and the setting modifier has an average particle diameter of 5 μm or less. Thus, the rate of dissolution of the setting modifier in water is high, and a setting modifier action by the setting modifier is exerted at an early stage. Therefore, in the rapid-hardening cement composition to which the rapid-hardening admixture of the present embodiment is added, variations in setting initial time due to environmental temperature becomes small. In addition, after completion of the setting modifier action by the setting modifier, since hardening of cement is accelerated by the calcium aluminate and the inorganic sulfate, it is possible to improve initial strength developing properties of the rapid-hardening cement composition. Therefore, by using the rapid-hardening admixture of the present embodiment, it is possible to regulate a setting initial time of the rapid-hardening cement composition to 5 minutes to 90 minutes, for example, it is possible to develop a practical strength within 1 hour of age in a case where the setting initial time is set to 50 minutes or less. Furthermore, the rapid-hardening admixture of the present embodiment hardly segregates even in a case of being stored for a long period of time, and the content of the setting modifier hardly becomes non-uniform. Therefore, even in a case where the rapid-hardening cement composition to which the rapid-hardening admixture of the present embodiment is added is stored for a long period of time, it is possible to stably maintain the effects of the rapid-hardening admixture.

Furthermore, in the rapid-hardening admixture composition of the present embodiment, the setting modifier contains one or more of inorganic carbonate, oxycarboxylic acid, sodium aluminate, and sodium sulfate. Thus, it is possible to reliably reduce variations in setting initial time of the rapid-hardening cement composition due to environmental temperature. In addition, since a setting modifier action by the setting modifier is exerted at an early stage, a setting initial time becomes more stable and longer, and fluidity of the rapid-hardening cement composition after addition of water becomes higher. Due to a particularly high rate of dissolution in water, sodium sulfate has a high effect of improving fluidity of the rapid-hardening cement composition after addition of water.

In addition, according to the method for producing a rapid-hardening admixture of the present embodiment, a step of mixing and crushing a clinker containing calcium aluminate and a setting modifier to prepare a mixed and crushed product is included. Thus, it is possible to obtain a mixed and crushed product in which fine particles of the setting modifier are dispersed in a state of being adhered to a surface of the calcium aluminate as primary particles or aggregated particles close thereto. As compared with the calcium aluminate, the setting modifier in this mixed and crushed product is fine, and thus easily dissolved in water. Therefore, in a case where water is added to the rapid-hardening cement composition to which the rapid-hardening admixture obtained by the present embodiment is added, the setting modifier is rapidly dissolved in water in a stable manner over a wide temperature range, and a setting modifier action by the setting modifier is exerted at an early stage. Thus, variations in setting initial time due to environmental temperature become small. In addition, even in a case of being stored for a long period of time, it is unlikely that the setting modifier is segregated and a content of the setting modifier becomes non-uniform. Therefore, even in a case of being stored for a long period of time, it is possible to stably maintain the effects of the rapid-hardening admixture.

Although the rapid-hardening admixture which is an embodiment of the present invention has been described above, the present invention is not limited thereto and can be appropriately changed within a scope that does not depart from the technical spirits of the invention.

For example, the rapid-hardening admixture of the present invention may contain a water-reducing agent, an AE water-reducing agent, a high performance water-reducing agent, a high performance AE water-reducing agent, a fluidizing agent, a waterproofing agent, a foaming agent, a defoaming agent, a blowing agent, an anti-rust agent for reinforced concrete, a admixing agent which is non-separable in water, a water-retention agent, a drying shrinkage reducing agent, a separation reducing agent (a thickening agent), an antifreeze or cold-resistant agent, and the like. In addition, the rapid-hardening admixture of the present invention can be used in combination with aggregates such as fine aggregate and coarse aggregate, and admixture materials such as redispersible polymer powder and silica fume.

EXAMPLES

Next, examples of the present invention will be described in detail together with comparative examples.

Types, compositions, and abbreviations of the materials used in these examples and comparative examples are shown in Table 1

TABLE 1

| Material | Composition and the like | Abbreviation |
|---|---|---|
| Calcium aluminate clinker | $12CaO \cdot 7Al_2O_3$, vitrification rate: 92% $SiO_2$: 3.9% | CA-CL |
| Inorganic sulfate | $CaSO_4$, hydrofluoric acid type II anhydrous gypsum, Blaine value of 9,850 $cm^2/g$ | CS |
| Ordinary Portland cement | Manufactured by Mitsubishi Materials Corporation | N |
| High early strength Portland cement | Manufactured by Mitsubishi Materials Corporation | H |
| Inorganic carbonate | $Na_2CO_3$, sodium carbonate particle size of 45 to 90 μm | Na-1 |
| | $Na_2CO_3$, sodium carbonate particle size of 90 to 150 μm | Na-2 |
| | $Na_2CO_3$, sodium carbonate particle size of 150 to 500 μm | Na-3 |
| Sodium aluminate | $Na_2AlO_2$, sodium aluminate particle size of 45 to 90 μm | Al-1 |
| | $Na_2AlO_2$, sodium aluminate particle size of 90 to 150 μm | Al-2 |
| | $Na_2AlO_2$, sodium aluminate particle size of 150 to 500 μm | Al-3 |
| Oxycarboxylic acid | Tartaric acid particle size of 45 to 90 μm | Ta-1 |
| | Tartaric acid particle size of 90 to 150 μm | Ta-2 |
| | Tartaric acid particle size of 150 to 500 μm | Ta-3 |
| Sodium sulfate | $Na_2SO_4$, sodium sulfate particle size of 150 to 500 μm | NS-3 |
| Fine aggregate | Dry silica sand (particle diameter of 90 μm to 3 mm) | S |
| Silica fume | Manufactured by EFACO (BET specific surface area of 22.5 $m^2/g$) | SF |
| Defoaming agent | San Nopco Limited, SN DEFOAMER 14HP | 14HP |
| Setting modifier 2 | Mixture of sodium carbonate:sodium aluminate:tartaric acid at mass ratio of 3:1:1 | K-set |
| Redispersible polymer powder | Manufactured by Nichigo-Movinyl Co., Ltd., LDM2071P, vinyl acetate/Veova/acrylic acid ester copolymer resin | P |
| Water-reducing agent | Manufactured by Lion Corporation, POLITY MX-335S polycarboxylic acid-based high-performance water-reducing agent | MX |

Example 1

100 parts by mass of calcium aluminate clinker (CA-CL), and, as setting modifiers, 1.0 parts by mass of sodium carbonate (Na-3), 0.5 parts by mass of sodium aluminate (Al-3), and 0.5 parts by mass of tartaric acid (Ta-3) were charged into a mixing and crushing machine at such a ratio, and were mixed and crushed until a Blaine specific surface area thereof reached 4,500 $cm^2/g$. The calcium aluminate contained in the resulting mixed and crushed product had an average particle diameter of 15 μm and the sodium carbonate had an average particle diameter of 3.0 μm. The average particle diameter of the sodium carbonate was measured by the following method.

(Measurement Method of Average Particle Diameter of Sodium Carbonate)

First of all, a particle shape of the resulting mixed and crushed product was observed using a scanning electron microscope (SEM). FIG. 1 shows SEM images of the mixed and crushed product. FIG. 1(A) shows an SEM image with a magnification of 1,000 times, and FIG. 1(B) shows an SEM image with a magnification of 3,000 times.

Figure 2:
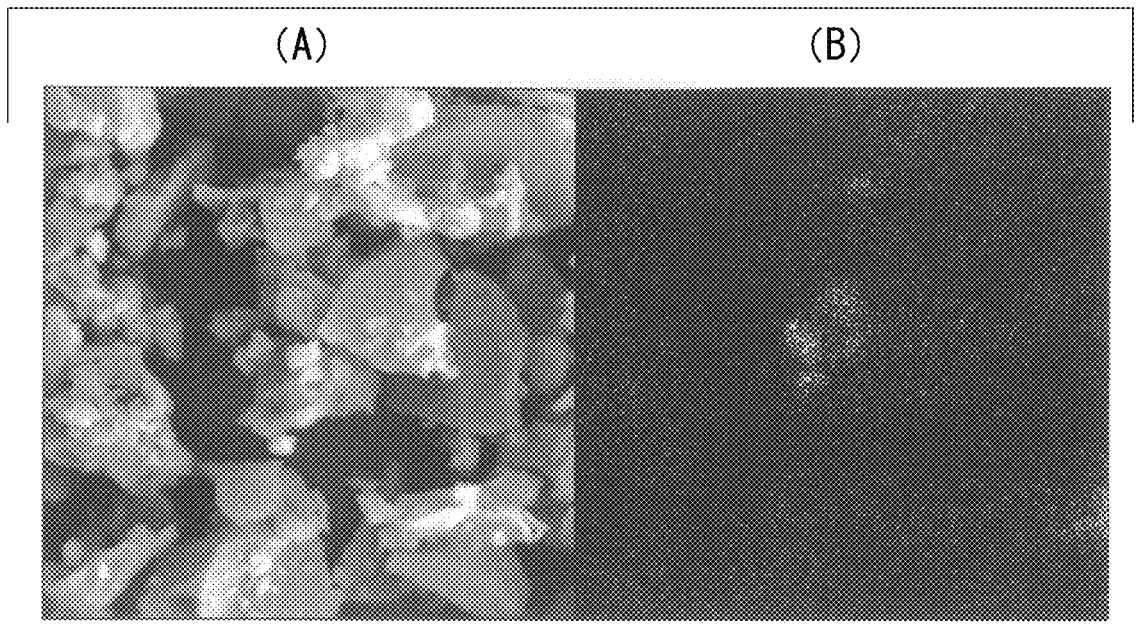
FIG. 2(A) is a scanning electron microscopic image obtained by enlarging a circled area in FIG. 1(B)
FIG. 2(B) is an EPMA mapping image of sodium obtained by performing elemental analysis of particles captured in the image.

Next, elemental analysis of the particles captured in the SEM images was carried out using an electron probe microanalyzer (EPMA). FIG. 2 shows the results. FIG. 2(A) is an SEM image obtained by enlarging a circled area in FIG. 1(B), and FIG. 2(B) is a mapping image of an element obtained by performing elemental analysis of particles captured in the SEM image using the EPMA. In FIG. 2(B), a white part represents sodium. From the SEM image of FIG. 2(A) and the mapping image of FIG. 2(B), particles of sodium carbonate were identified, and the longest diameter of the particles identified as the sodium carbonate was calculated using the SEM image of FIG. 1(B). By repeating this operation, 100 particle diameters of the sodium carbonate were calculated, and the average value thereof was calculated.

Anhydrous gypsum (CS) as the inorganic sulfate was added to a mixer at a proportion of 120 parts by mass with respect to 100 parts by mass of the mixed and crushed product obtained as described above, and mixed. The obtained mixture was designated as a rapid-hardening admixture (SA-1).

Comparative Example 1

Calcium aluminate clinker (CA-CL) was charged into a mixing and crushing machine, and crushed alone until a Blaine specific surface area thereof reached 4,500 $cm^2/g$, to obtain a calcium aluminate powder.

Anhydrous gypsum (CS) was charged into a mixer at a proportion of 120 parts by mass with respect to 100 parts by mass of the obtained calcium aluminate powder, and mixed. The obtained mixture was designated as a rapid-hardening admixture (SA-2).

Examples 2 to 4, and Comparative Examples 2 to 4

The rapid-hardening admixture (SA-1) obtained in Example 1, the rapid-hardening admixture (SA-2) obtained in Comparative Example 1, ordinary Portland cement (N), high early strength Portland cement (H), inorganic carbonate (Na-1 to Na-3), sodium aluminate (Al-1 to Al-3), tartaric acid (Ta-1 to Ta-3), fine aggregate (S), silica fume (SF), defoaming agent (14HP), setting modifier 2 (K-set), redispersible polymer powder (P), and water-reducing agent (MX) are charged into a mixer, respectively, at proportions (parts by mass) shown in Table 2, to prepare rapid-hardening cement compositions of Examples 2 to 4, and Comparative Examples 2 to 4.

The inorganic carbonate (Na-1 to Na-3), sodium aluminate (Al-1 to Al-3), and tartaric acid (Ta-1 to Ta-3) shown in Table 2 were used as setting modifiers in Comparative Examples 2 to 4, and have a particle size distribution of 45 to 500 μm.

TABLE 2

| Material used | Example 2 | Example 3 | Example 4 | Comparative Example 2 | Comparative Example 3 | Comparative Example 4 |
|---|---|---|---|---|---|---|
| SA-1 | 100 | 100 | 100 | — | — | — |
| SA-2 | — | — | — | 100 | 100 | 100 |
| N | 150 | 330 | — | 150 | 330 | — |
| H | — | — | 200 | — | — | 200 |
| Na-1 | — | — | — | 0.16 | 0.16 | 0.16 |
| Na-2 | — | — | — | 0.36 | 0.36 | 0.36 |
| Na-3 | — | — | — | 0.16 | 0.16 | 0.16 |
| Al-1 | — | — | — | 0.07 | 0.07 | 0.07 |
| Al-2 | — | — | — | 0.11 | 0.11 | 0.11 |
| Al-3 | — | — | — | 0.07 | 0.07 | 0.07 |
| Ta-1 | — | — | — | 0.07 | 0.07 | 0.07 |
| Ta-2 | — | — | — | 0.11 | 0.11 | 0.11 |
| Ta-3 | — | — | — | 0.07 | 0.07 | 0.07 |
| S | 250 | 100 | 450 | 250 | 100 | 450 |
| SF | — | — | 20 | — | — | 20 |
| 14HP | — | 0.01 | 0.03 | — | 0.01 | 0.03 |
| K-set | 1 | 1.2 | 0.8 | 1.2 | 1.4 | 1 |
| P | — | 9 | 6 | — | 9 | 6 |
| MX | 0.03 | — | 0.04 | 0.03 | — | 0.04 |
| Water | 95 | 260 | 110 | 95 | 260 | 110 |

Unit: Parts by mass

The temperature stability and storage stability were evaluated on the obtained rapid-hardening cement compositions by the following method.

(1) Temperature Stability

Cement mortars were prepared by kneading the rapid-hardening cement composition immediately after production and water at an environmental temperature of 5° C., 20° C., and 35° C. at proportions shown in Table 2. Using the prepared cement mortars, with respect to each of Example 2 and Comparative Example 2, the setting initial time and the compression strength were measured. With respect to each of Example 3 and Comparative Example 3, the setting initial time, the flow value (P funnel), and the compression strength were measured. With respect to each of Example 4 and Comparative Example 5, the setting initial time, the flow value (J14 funnel), and the compression strength were measured.

The setting initial time was measured in accordance with JIS R 5201 "Physical Test Method for Cement". The compression strength was measured in accordance with JIS R 5201 "Physical Test Method for Cement". Flow value (P funnel) was measured in accordance with the standard of Japan Society of Civil Engineers, JSCE-F 521 "Method of Fluidity Test of Injection Mortar for Prepacked Concrete (Method by P funnel)". Flow value ($J_{14}$ funnel): $J_{14}$ funnel flow-down time was measured in accordance with JSCE-F 541 "Fluidity Test of Filled Mortar".

The results are shown in Tables 3 to 5.

TABLE 3

| | Environmental temperature (° C.) | Setting initial time (min) | Compression strength (N/mm²) | | | |
|---|---|---|---|---|---|---|
| | | | Age of 1 hour | Age of 2 hours | Age of 3 hours | Age of 7 days |
| Example 2 | 5 | 48 | 9.1 | 13.5 | 18.0 | 48.9 |
| | 20 | 51 | 10.6 | 15.2 | 18.8 | 55.1 |
| | 35 | 49 | 11.0 | 15.6 | 19.3 | 56.8 |
| Comparative Example 2 | 5 | 49 | 7.0 | 11.0 | 14.4 | 45.8 |
| | 20 | 46 | 8.2 | 12.8 | 15.3 | 47.9 |
| | 35 | 38 | 8.3 | 13.1 | 15.9 | 48.4 |

TABLE 4

| | Environmental temperature (° C.) | Flow value (P funnel; sec) | Setting initial time (min) | Compression strength (N/mm²) | | |
|---|---|---|---|---|---|---|
| | | | | Age of 2 hours | Age of 3 hours | Age of 7 days |
| Example 3 | 5 | 11.5 | 50 | 4.2 | 8.2 | 26.8 |
| | 20 | 11.0 | 48 | 4.8 | 8.5 | 27.6 |
| | 35 | 10.8 | 44 | 5.1 | 9.3 | 28.1 |
| Comparative Example 3 | 5 | 13.5 | 58 | 1.2 | 5.0 | 24.5 |
| | 20 | 12.6 | 50 | 1.8 | 5.8 | 26.2 |
| | 35 | 10.1 | 32 | 2.9 | 6.5 | 27.7 |

TABLE 5

| | Environmental temperature (° C.) | Flow value ($J_4$ funnel; sec) | Setting initial time (min) | Compression strength (N/mm²) | | |
|---|---|---|---|---|---|---|
| | | | | Age of 2 hours | Age of 3 hours | Age of 7 days |
| Example 4 | 5 | 4.6 | 38 | 16.8 | 22.8 | 43.1 |
| | 20 | 4.4 | 35 | 18.2 | 25.6 | 46.8 |
| | 35 | 4.3 | 35 | 19.1 | 26.7 | 46.5 |
| Comparative Example 4 | 5 | 4.8 | 43 | 11.4 | 15.2 | 38.6 |
| | 20 | 4.5 | 32 | 12.0 | 15.6 | 40.5 |
| | 35 | 3.9 | 25 | 12.3 | 16 | 41.5 |

From the results of Tables 3 to 5, it was confirmed that all rapid-hardening cement compositions (Examples 2 to 4) containing the rapid-hardening admixture (SA-1, Example 1) in which the setting modifier was dispersed as fine particles having an average particle diameter of 5 μm or less exhibit small variations in setting initial time due to environmental temperature, high compression strength up to 1 to 3 hours of age, and excellent initial strength developing properties, as compared with rapid-hardening cement compositions (Comparative Examples 2 to 4) containing the rapid-hardening admixture (SA-2, Comparative Example 1) in which the setting modifier is dispersed as particles having a wide particle size distribution of 45 to 500 μm. In addition, from the results of Example 3 and Comparative Example 3, and Example 4 and Comparative Example 4, it was confirmed that the rapid-hardening cement composition containing the rapid-hardening admixture (SA-1, Example 1) also exhibits small variations due to the environmental temperature with respect to the flow value, as compared with the rapid-hardening cement compositions (Comparative Examples 2 to 4) containing the rapid-hardening admixture (SA-2, Comparative Example 1).

(2) Storage Stability

The rapid-hardening cement composition was packed in a plastic bag (capacity: 12 L), and pinholes (pore diameter: 0.5 mm) were opened at four corners of the plastic bag. The plastic bags were stored in a room at a temperature of 30° C. and a humidity of 80% RH for 3 months and 6 months, respectively. Cement mortars were prepared by kneading the rapid-hardening cement compositions after storage and water at an environmental temperature of 20° C. at proportions shown in Table 2. Using the prepared cement mortars, with respect to each of Example 2 and Comparative Example 2, the setting initial time and the compression strength were measured. With respect to each of Example 3 and Comparative Example 3, the setting initial time, the flow value (P funnel), and the compression strength were measured. With respect to each of Example 4 and Comparative Example 4, the setting initial time, the flow value (J14 funnel), and the compression strength were measured.

The results are shown in Tables 6 to 8.

TABLE 6

|  | Storage period (month) | Setting initial time (min) | Compression strength (N/mm$^2$) | | | |
|---|---|---|---|---|---|---|
|  |  |  | Age of 1 hour | Age of 2 hours | Age of 3 hours | Age of 7 days |
| Example 2 | Immediately after production | 51 | 10.6 | 15.2 | 18.8 | 55.1 |
|  | 3 | 52 | 10.5 | 15.3 | 19.0 | 55.8 |
|  | 6 | 49 | 10.6 | 15.5 | 19.2 | 56.0 |
| Comparative Example 2 | Immediately after production | 46 | 8.2 | 12.8 | 15.3 | 47.9 |
|  | 3 | 68 | Not available | 2 | 7.5 | 42.5 |
|  | 6 | 85 | Not available | Not available | 2.9 | 25.1 |

TABLE 7

|  | Storage period (month) | Flow value (P funnel; sec) | Setting initial time (min) | Compression strength (N/mm$^2$) | | |
|---|---|---|---|---|---|---|
|  |  |  |  | Age of 2 hours | Age of 3 hours | Age of 7 days |
| Example 3 | Immediately after production | 11.0 | 48 | 4.8 | 8.5 | 27.6 |
|  | 3 | 11.1 | 49 | 4.6 | 8.6 | 27.4 |
|  | 6 | 11.0 | 49 | 4.8 | 8.5 | 28.6 |
| Comparative Example 3 | Immediately after production | 12.6 | 50 | 1.8 | 5.8 | 26.2 |
|  | 3 | 15.0 | 82 | Not available | 2.1 | 24.0 |
|  | 6 | 16.2 | 120 | Not available | Not available | 21.5 |

TABLE 8

|  | Storage period (month) | Flow value (J$_{14}$ funnel; sec) | Setting initial time (min) | Compression strength (N/mm$^2$) | | |
|---|---|---|---|---|---|---|
|  |  |  |  | Age of 2 hours | Age of 3 hours | Age of 7 days |
| Example 4 | Immediately after production | 4.4 | 35 | 18.2 | 25.6 | 46.8 |
|  | 3 | 4.6 | 37 | 18.0 | 25.3 | 48.1 |
|  | 6 | 4.3 | 37 | 18.3 | 25.5 | 48.6 |
| Comparative Example 4 | Immediately after production | 4.5 | 32 | 12.0 | 15.6 | 40.5 |
|  | 3 | 5.9 | 65 | 1.6 | 3.9 | 39.9 |
|  | 6 | 6.8 | 125 | Not available | 2.9 | 36.5 |

From the results of Tables 6 to 8, it was confirmed that all rapid-hardening cement compositions (Examples 2 to 4) containing the rapid-hardening admixture (SA-1, Example 1) in which the setting modifier is dispersed as fine particles having an average particle diameter of 5 μm or less exhibit small variations in setting initial time due to storage, high compression strength up to 1 to 3 hours of age, and excellent initial strength developing properties, as compared with rapid-hardening cement compositions (Comparative Examples 2 to 4) containing the rapid-hardening admixture (SA-2, Comparative Example 1) in which the setting modifier is dispersed as particles having a wide particle size distribution of 45 to 500 μm. In addition, from the results of Example 3 and Comparative Example 3, and Example 4 and Comparative Example 4, it was confirmed that the rapid-hardening cement compositions containing the rapid-hardening admixture (SA-1, Example 1) also exhibit small variations due to storage with respect to the flow value, as compared with the rapid-hardening cement compositions (Comparative Examples 2 to 4) containing the rapid-hardening admixture (SA-2, Comparative Example 1).

Example 5

100 parts by mass of calcium aluminate clinker (CA-CL), and, as setting modifiers, 1.0 parts by mass of sodium carbonate (Na-3), 0.5 parts by mass of sodium aluminate (Al-3), 0.5 parts by mass of tartaric acid (Ta-3), and 1.0 parts by mass of sodium sulfate (NS-3) were charged into a mixing and crushing machine at such a ratio, and were mixed and crushed until a Blaine specific surface area thereof reached 4,560 cm$^2$/g. The calcium aluminate contained in the resulting mixed and crushed product had an average particle diameter of 14.2 μm and the sodium carbonate had an average particle diameter of 2.8 μm.

Anhydrous gypsum (CS) was charged into a mixer at a proportion of 120 parts by mass with respect to 100 parts by mass of the mixed and crushed product obtained as described above, and mixed. The obtained mixture was designated as a rapid-hardening admixture (SA-3).

Example 6

The rapid-hardening admixture (SA-3) obtained in Example 5, ordinary Portland cement (N), inorganic carbonate (Na-1 to Na-3), sodium aluminate (Al-1 to Al-3), tartaric acid (Ta-1 to Ta-3), fine aggregate (S), defoaming agent (14HP), setting modifier 2 (K-set), and redispersible polymer powder (P) were charged into a mixer, respectively, at proportions (parts by mass) shown in Table 9, to prepare a rapid-hardening cement composition of Example 6. In Table 9, material compositions of the rapid-hardening cement compositions prepared in Example 3 and Comparative Example 3 were also described. The rapid-hardening cement composition of Example 6 has the same composition as the rapid-hardening cement composition of Example 3 except that the rapid-hardening admixture (SA-3) contained sodium sulfate.

The inorganic carbonate (Na-1 to Na-3), the sodium aluminate (Al-1 to Al-3), and the tartaric acid (Ta-1 to Ta-3) shown in Table 9 are used as setting modifiers in Comparative Example 3, and have a particle size distribution of 45 to 500 μm.

TABLE 9

| Material used | Example 6 | Example 3 | Comparative Example 3 |
|---|---|---|---|
| SA-1 | | 100 | |
| SA-2 | — | | 100 |
| SA-3 | 100 | | — |

TABLE 9-continued

| Material used | Example 6 | Example 3 | Comparative Example 3 |
|---|---|---|---|
| N | 330 | 330 | 330 |
| H | — | — | — |
| Na-1 | — | — | 0.16 |
| Na-2 | — | — | 0.36 |
| Na-3 | — | — | 0.16 |
| Al-1 | — | — | 0.07 |
| Al-2 | — | — | 0.11 |
| Al-3 | — | — | 0.07 |
| Ta-1 | — | — | 0.07 |
| Ta-2 | — | — | 0.11 |
| Ta-3 | — | — | 0.07 |
| S | 100 | 100 | 100 |
| SF | — | — | — |
| 14HP | 0.01 | 0.01 | 0.01 |
| K-set | 1.2 | 1.2 | 1.4 |
| P | 9 | 9 | 9 |
| MX | — | — | — |
| Water | 260 | 260 | 260 |

Unit: Parts by mass (1) Temperature stability and (2) storage stability were evaluated for the obtained rapid-hardening cement compositions by the above method. Evaluation was carried out by measuring the flow value (P funnel), the setting initial time, and the compression strength.

Table 10 shows the evaluation results of the temperature stability and Table 11 shows the evaluation results of the storage stability, respectively. In Tables 10 and 11, the evaluation results of the temperature stability and storage stability of the rapid-hardening cement compositions prepared in Example 3 and Comparative Example 3 were also described.

TABLE 10

| | Environmental temperature (° C.) | Flow value (P funnel; sec) | Setting initial time (min) | Compression strength (N/mm$^2$) | | |
|---|---|---|---|---|---|---|
| | | | | Age of 2 hours | Age of 3 hours | Age of 7 days |
| Example 6 | 5 | 10.8 | 51 | 4.3 | 8.5 | 27.2 |
| | 20 | 10.5 | 50 | 4.9 | 8.6 | 28.6 |
| | 35 | 10.2 | 48 | 5.3 | 9.5 | 28.7 |
| Example 3 | 5 | 11.5 | 50 | 4.2 | 8.2 | 26.8 |
| | 20 | 11.0 | 48 | 4.8 | 8.5 | 27.6 |
| | 35 | 10.8 | 44 | 5.1 | 9.3 | 28.1 |
| Comparative Example 3 | 5 | 13.5 | 58 | 1.2 | 5.0 | 24.5 |
| | 20 | 12.6 | 50 | 1.8 | 5.8 | 26.2 |
| | 35 | 10.1 | 32 | 2.9 | 6.5 | 27.7 |

TABLE 11

| | Storage period (month) | Flow value (P funnel; sec) | Setting initial time (min) | Compression strength (N/mm$^2$) | | |
|---|---|---|---|---|---|---|
| | | | | Age of 2 hours | Age of 3 hours | Age of 7 days |
| Example 6 | Immediately after production | 10.5 | 50 | 4.9 | 8.6 | 28.6 |
| | 3 | 10.6 | 51 | 4.8 | 8.7 | 28.5 |
| | 6 | 10.6 | 51 | 4.8 | 8.9 | 28.9 |
| Example 3 | Immediately after production | 11.0 | 48 | 4.8 | 8.5 | 27.6 |
| | 3 | 11.1 | 49 | 4.6 | 8.6 | 27.4 |
| | 6 | 11.0 | 49 | 4.8 | 8.5 | 28.6 |

TABLE 11-continued

| | Storage period (month) | Flow value (P funnel; sec) | Setting initial time (min) | Compression strength (N/mm$^2$) | | |
| --- | --- | --- | --- | --- | --- | --- |
| | | | | Age of 2 hours | Age of 3 hours | Age of 7 days |
| Comparative Example 3 | Immediately after production | 12.6 | 50 | 1.8 | 5.8 | 26.2 |
| | 3 | 15.0 | 82 | Not available | 2.1 | 24.0 |
| | 6 | 16.2 | 120 | Not available | Not available | 21.5 |

From the results of Tables 10 and 11, it was confirmed that the rapid-hardening cement composition of Example 6 using the rapid-hardening admixture containing sodium sulfate (SA-3, Example 5) exhibits high fluidity after addition of water as compared with the rapid-hardening compositions of Example 3 and Comparative Example 3, from the viewpoint that flow values are low at the respective environmental temperatures and the respective storage times.

What is claimed is:

1. A rapid-hardening admixture, comprising:
   calcium aluminate;
   inorganic sulfate; and
   a setting modifier,
   wherein the calcium aluminate has an average particle diameter in a range of 8 μm to 100 μm, and the setting modifier has an average particle diameter of 5 μm or less,
   the inorganic sulfate is anhydrous gypsum, and
   the setting modifier comprises at least one selected from the group consisting of inorganic carbonate, oxycarboxylic acid, sodium aluminate, and sodium sulfate.

2. The rapid-hardening admixture according to claim 1, wherein the calcium aluminate has one or more compositions selected from the group consisting of $12CaO \cdot 7Al_2O_3$, $11CaO \cdot 7Al_2O_3 \cdot CaF_2$, and $CaO \cdot Al_2O_3$, and
   the calcium aluminate has a vitrification rate of 80% or more.

3. The rapid-hardening admixture according to claim 1, wherein the inorganic sulfate has a Blaine specific surface area of 8,000 cm$^2$/g or more.

4. The rapid-hardening admixture according to claim 1, wherein, with respect to 100 parts by mass of the calcium aluminate, the inorganic sulfate is contained in a range of 50 parts by mass to 200 parts by mass, and the setting modifier is contained in a range of 0.1 parts by mass to 10 parts by mass.

5. A method for producing a rapid-hardening admixture, the method comprising:
   mixing and crushing a clinker comprising calcium aluminate and a setting modifier to obtain a mixed and crushed product; and
   mixing the mixed and crushed product with inorganic sulfate,
   wherein
   the inorganic sulfate is anhydrous gypsum, and
   the setting modifier comprises at least one selected from the group consisting of inorganic carbonate, oxycarboxylic acid, sodium aluminate, and sodium sulfate.

6. The method according to claim 5,
   wherein the clinker before the mixing and crushing has an average particle diameter in a range of 1 mm to 30 mm,
   the setting modifier before the mixing and crushing has a particle diameter in a range of 150 μm to 500 μm, and
   the mixing and crushing is carried out until a Blaine specific surface area of the mixed and crushed product falls within a range of 3,000 cm$^2$/g to 5,500 cm$^2$/g.

* * * * *